Patented Nov. 3, 1942

2,301,082

UNITED STATES PATENT OFFICE 2,301,082

TOOL ALLOY

Charles J. Schafer, Baltimore, Md.

No Drawing. Original application May 13, 1941, Serial No. 393,262. Divided and this application February 2, 1942, Serial No. 429,339

4 Claims. (Cl. 75—123)

This invention relates to alloys and has for its object the provision of new zirconium, columbium, and tungsten containing alloys of great hardness, strength and durability, and especially adapted for use in the making of high speed cutting tools for machine shop practices as well as finer cutting instruments and blades of many types, including those for surgical and dental use. The alloys are also useful in making other tools such as twist drills, saws, files, wrenches, shears, and the like.

This application is a division of my copending application, Serial No. 393,262, filed May 13, 1941.

My novel alloys may be used to great advantage in place of many of the alloy and carbon steels, but without the necessity of tempering the products except in very special cases involving the more intricately formed tools such as certain twist drills, threading dies and some similar tools, which have to be forged or drawn into shape and then completed by hardening. The novel alloys are subject to some variation in their iron content depending upon the desired resistance to the action of acids or to tarnishing, for example due to the sterilizing medium which may be used. The alloys are generally non-corrosive and non-tarnishing and resistant to many acids, and they may be welded, forged, swaged, heated, and reheated with a minimum of loss.

The chief constituents of the new alloys are zirconium, tungsten, and columbium, the last named being combined with a certain amount of tantalum which occurs in the same ores and which it is not necessary to eliminate, since it lends certain desirable qualities to the alloy. I have found that the novel alloy is superior in properties, including its hardness and tensile strength to the tungsten, molybdenum, vanadium, nickel, and chrome steels which are now in widespread use.

The alloys may be produced in bar stock or cast in the ultimate form of tool or other product in which it is to be used. Unlike certain prior products they are not made from sintered or granular materials compacted under pressure, such as for example tungsten-carbide, and the alloy may comprise the entire tool instead of made as a tip for a steel shank as in the case of certain other cutting products.

The general range of percentages of the various elements comprising the group of alloys provided by the present invention may be set forth as follows:

| | Per cent |
|---|---|
| Zirconium | From 10 to 40 |
| Columbium | From 3 to 20 |
| Tantalum | From 1 to 8 |
| Titanium | From none to 15 |
| Tungsten | In appreciable amounts up to 25 |
| Iron | Balance |

Conveniently, the columbium and the tantalum are introduced in combination since they are obtained from the same ores in the pre-melt or reduction step, as will be more clearly understood as the specification proceeds.

For a cutting tool for general use or for the preparation of a bar stock for the making of tools, the following two formulas may be employed. The first will yield a stock having a hardness of 75 on the Rockwell-C scale, and the second will have a hardness of 65 on the same scale.

*Hardness 75*

| | Per cent |
|---|---|
| Zirconium | About 30 |
| Columbium | About 12 |
| Tantalum | About 2.5 |
| Titanium | About 7.5 |
| Iron | About 48 |

*Hardness 65*

| | Per cent |
|---|---|
| Zirconium | About 35 |
| Columbium | About 14 |
| Tantalum | About 3 |
| Iron | About 48 |

For the production of bar stock of greater hardness than those set forth above, the percentage of titanium may be proportionately increased up to about 15%.

When tungsten is used in the preparation of the basic bar stock it is preferably employed in the amounts from 15% to 25%, the titanium being preferably reduced to about 3%, the columbium and tantalum reduced by about one-half, and the balance subtracted from the iron content. This will yield an alloy of the following approximate composition:

| | Per cent |
|---|---|
| Zirconium | 30 |
| Columbium | 6 |
| Tantalum | 1.5 |
| Titanium | 3 |
| Tungsten | 15-25 |
| Iron | Balance |

Another suggested formula, within the scope of the invention, and particularly adapted for the manufacture of high grade drawing and cutting dies, is as follows, the percentages of ingredients being approximate:

| | Per cent |
|---|---|
| Zirconium | 30 |
| Columbium | 15 |
| Tantalum | 4 |
| Tungsten | 8 |
| Iron | 43 |

In producing these alloys, certain of the constituents are preferably reduced directly from their ores, and reference is made to my copending application, Serial No. 393,262, and to my application, Serial No. 412,500, which is a continuation-in-part of the first named application, for a complete disclosure of the preferred modes of producing the novel alloys which comprise the subject of the present application.

Having thus described the invention, what is claimed as new and desired to be secured by Letters Patent is:

1. A hard, high-tensile strength alloy suitable for high speed cutting tools or the like, which comprises 10% to 40% zirconium, 3% to 20% columbium, 1% to 8% tantalum, from appreciable amounts up to 15% titanium, from appreciable amounts up to 25% tungsten, and the balance iron.

2. A hard, high-tensile strength alloy suitable for high speed cutting tools or the like, which comprises 10% to 40% zirconium, 3% to 20% columbium, 1% to 8% tantalum, 3% to 15% titanium, 15% to 25% tungsten, and the balance iron.

3. An alloy suitable for drawing and cutting dies which comprises about 30% zirconium, from 15% to 8% columbium, from 4% to 2% tantalum, from appreciable amounts up to 5% titanium, from appreciable amounts up to 8% tungsten, and the balance iron.

4. A hard, high-tensile strength alloy suitable for high speed cutting tools or the like, which comprises from 10% to 40% zirconium, from 4% to 28% columbium and tantalum combined, from appreciable amounts up to 15% titanium, from appreciable amounts up to 25% tungsten, and the balance iron.

CHARLES J. SCHAFER.